(12) United States Patent
Hayton et al.

(10) Patent No.: US 9,183,810 B2
(45) Date of Patent: Nov. 10, 2015

(54) ELECTRONIC DOCUMENT READING DEVICES

(71) Applicant: FLEXENABLE LIMITED, Cambridgeshire (GB)

(72) Inventors: Carl Hayton, Cambridge (GB); Victor T. Pan, Fremont, CA (US); Kenneth R. Venegas, San Jose, CA (US)

(73) Assignee: FLEXENABLE LIMITED, Cambridge (GB)

( * ) Notice: Subject to any disclaimer, the term of this patent is extended or adjusted under 35 U.S.C. 154(b) by 38 days.

(21) Appl. No.: 14/088,646

(22) Filed: Nov. 25, 2013

(65) Prior Publication Data

US 2014/0071078 A1    Mar. 13, 2014

Related U.S. Application Data

(62) Division of application No. 12/647,632, filed on Dec. 28, 2009, now Pat. No. 8,619,021.

(30) Foreign Application Priority Data

Oct. 23, 2009    (GB) .................................. 0918619.8

(51) Int. Cl.
*G09G 3/34* (2006.01)
*G09G 5/00* (2006.01)
(Continued)

(52) U.S. Cl.
CPC .............. *G09G 5/003* (2013.01); *G06F 1/1626* (2013.01); *G06F 1/1643* (2013.01); *G06F 1/1652* (2013.01); *G06F 3/044* (2013.01); *G06F 3/0412* (2013.01); *G09G 3/344* (2013.01)

(58) Field of Classification Search
CPC ..... G09G 5/003; G06F 1/1626; G06F 1/1643; G06F 1/1652; G06F 3/01412; G06F 3/044; G06F 3/344
USPC .......................................... 345/107; 359/296
See application file for complete search history.

(56) References Cited

U.S. PATENT DOCUMENTS 6,021,306 A    2/2000    McTaggart
6,124,851 A    9/2000    Jacobson
(Continued)

FOREIGN PATENT DOCUMENTS

GB    2446499    8/2006
JP    2001356323    12/2001
(Continued)

OTHER PUBLICATIONS

United Kigdom Search Report for corresponding Application No. GB0918619.6 dated Feb. 22, 2010.
(Continued)

*Primary Examiner* — Jonathan Boyd
(74) *Attorney, Agent, or Firm* — Snell & Wilmer L.L.P.

(57) ABSTRACT

We describe an architecture for a large-area, touch-sensitive electronic document reading device which is able to tolerate bending. In broad terms, a control circuit board is mounted behind a flexible display structure in the housing and at respective points of attachment of first and second laminar connectors to the control circuit board each laminar connector has a plurality of electrical connections running along a longitudinal direction of the laminar connector and disposed alongside one another in a transverse direction across the laminar connector. At the respective points of attachment of the first and second laminar connectors to the control circuit board the longitudinal directions of the laminar connectors are aligned such that, when said device is flexed, a relative displacement in said longitudinal direction between said control circuit board and of said display structure can be tolerated without damage to the control electronics, touch sensitive display screen or connections therebetween.

6 Claims, 14 Drawing Sheets

(51) Int. Cl.
*G06F 1/16* (2006.01)
*G06F 3/041* (2006.01)
*G06F 3/044* (2006.01)

(56) References Cited

U.S. PATENT DOCUMENTS

| | | | |
|---|---|---|---|
| 6,577,496 B1 | 6/2003 | Gioscia et al. | |
| 7,058,829 B2 | 6/2006 | Hamilton | |
| 2002/0180344 A1 | 12/2002 | Lichtfuss | |
| 2002/0190961 A1* | 12/2002 | Chen | 345/173 |
| 2003/0134460 A1 | 7/2003 | Forbes | |
| 2003/0227441 A1 | 12/2003 | Hioki et al. | |
| 2004/0201633 A1 | 10/2004 | Barsness et al. | |
| 2005/0151742 A1 | 7/2005 | Hong et al. | |
| 2005/0260551 A1 | 11/2005 | Rubin et al. | |
| 2006/0077190 A1 | 4/2006 | Zhou et al. | |
| 2006/0119615 A1 | 6/2006 | Zhou et al. | |
| 2006/0119760 A1 | 6/2006 | Okuda | |
| 2006/0125802 A1 | 6/2006 | Liang et al. | |
| 2006/0133664 A1 | 6/2006 | Hong et al. | |
| 2006/0139308 A1 | 6/2006 | Jacobson et al. | |
| 2007/0028086 A1 | 2/2007 | Oshima et al. | |
| 2007/0059520 A1 | 3/2007 | Hatin et al. | |
| 2007/0115258 A1 | 5/2007 | Cupps et al. | |
| 2008/0042992 A1 | 2/2008 | Kim | |
| 2008/0062349 A1 | 3/2008 | Komori | |
| 2008/0106191 A1* | 5/2008 | Kawase | 313/504 |
| 2008/0158651 A1* | 7/2008 | Kawase et al. | 359/296 |
| 2008/0211733 A1* | 9/2008 | Huitema | 345/3.1 |
| 2008/0297496 A1 | 12/2008 | Watson et al. | |

FOREIGN PATENT DOCUMENTS

| | | |
|---|---|---|
| JP | 2007264923 | 10/2007 |
| WO | 0147043 | 6/2001 |
| WO | 0147045 | 6/2001 |
| WO | 03071346 | 8/2003 |
| WO | 2004070466 | 8/2004 |
| WO | 2006056808 | 6/2006 |
| WO | 2006059162 | 6/2006 |
| WO | 2006061658 | 6/2006 |
| WO | 2006106365 | 10/2006 |
| WO | 2007012899 | 2/2007 |
| WO | 2007029028 | 3/2007 |
| WO | 2007144549 | 12/2007 |
| WO | 2008150600 | 12/2008 |
| WO | 2009053740 | 4/2009 |
| WO | 2009053743 | 4/2009 |
| WO | 2009053747 | 4/2009 |
| WO | 2009075577 | 6/2009 |

OTHER PUBLICATIONS

International Preliminary Report on Patentability for PCT/GB2010/051777 dated Apr. 24, 2012.
Office Action dated May 23, 2012 for U.S. Appl. No. 12/647,632.
Office Acton dated Jan. 3, 3013 for U.S. Appl. No. 12/647,632.
Office Action dated Mar. 12, 2013 for U.S. Appl. No. 12/647,632.

* cited by examiner

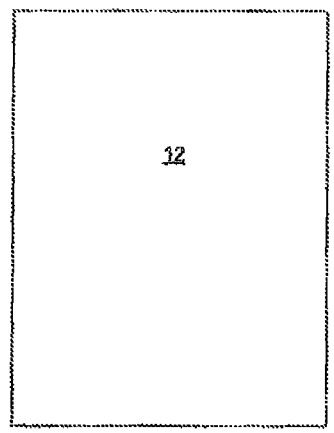
Figure 1a
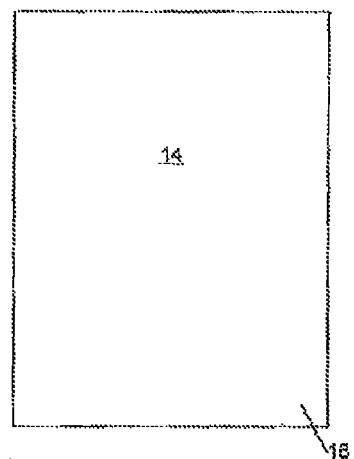
Figure 1b
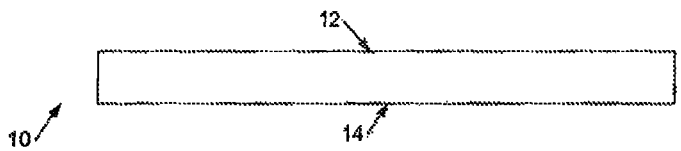
Figure 1c
| 100 | FRONT PANEL |
|---|---|
| 101 | ELECTRODE LINE (TOUCH SCREEN) |
|---|---|
| 102 | MOISTURE BARRIER |
| 104 | ELECTROPHORETIC DISPLAY |
| 106 | ORGANIC ACTIVE MATRIX PIXEL DRIVER CIRCUITRY |
| 108 | SUBSTRATE |
| 110 | MOISTURE BARRIER |
Figure 2

ELECTRONIC DOCUMENT READING DEVICES

CROSS-REFERENCE TO RELATED APPLICATIONS

This application is a divisional of U.S. application Ser. No. 12/647,632 entitled "ELECTRONIC DOCUMENT READING DEVICES", filed on Dec. 28, 2009 and claims the right of priority to United Kingdom Application No. 0918619.8 entitled "ELECTRONIC DOCUMENT READING DEVICES," filed on Oct. 23, 2009, which applications are incorporated herein by reference.

FIELD OF THE INVENTION

This invention relates to architectures for thin, flex-tolerant electronic document reading devices, especially large-area devices.

BACKGROUND TO THE INVENTION

Background prior art relating to electronic document reading devices can be found in U.S. Pat. No. 6,124,851, US2004/0201633, US2006/0133664, US2006/0125802, US2006/0139308, US2006/0077190, US2005/0260551, U.S. Pat. No. 6,124,851, U.S. Pat. No. 6,021,306, US2005/0151742, and US2006/0119615. Examples of electronic document reading devices are the Iliad Ilex®, the Amazon Kindle® and the Sony® Reader. Background prior art relating to power saving can be found in: US2007/0028086, US 2007/0115258, and U.S. Pat. No. 7,058,829.

We have previously described electronic document reading devices using an electrophoretic display with a flexible or flex-tolerant backplane based on plastic (solution-deposited) electronics, for example in our earlier applications PCT/GB2006/050235, PCT/GB2008/050980, PCT/GB2008/050977, PCT/GB2008/050985, PCT/GB2008/050985, and PCT/GB2008/050985, hereby incorporated by reference. We have described an electronic document reading device with a touch sensitive display using resistive touch screen technology in WO2007/012899, and a device using projected capacitance touch sensing in our UK patent application GB 0916806.3 entitled "Touch Screen Displays" filed 24 Sep. 2009.

The inventors are aiming to produce a flex-tolerant, thin, large area electronic document reading device using the flexible display screen technology we have previously described. For example in embodiments the device is able to provide a touch-sensitive display of an A4 or Letter format page at least 0.7:1, preferably substantially 1:1 size on a flex-tolerant device with a front-rear thickness of substantially less than 1 cm. However the construction of a large-area, thin, flex-tolerant device with a large touch screen presents special problems.

SUMMARY OF THE INVENTION

According to a first aspect of the invention there is therefore provided a flex-tolerant electronic document reading device, the device comprising a flexible display structure comprising: a pixellated flexible display screen, an active matrix backplane bearing a plurality of pixel driver circuits for driving pixels of said display screen, said active matrix backplane having a flexible plastic substrate, said flexible display screen being mounted on said active matrix backplane, and a touch sensing layer mounted over a display surface of said display screen to sense an X-Y touch position on said display screen; a control circuit board carrying control electronics for the electronic document reading device said control circuit board being attached by flexible mounts to said display structure; a flex-tolerant housing for said display structure and control circuit board; wherein said active matrix backplane is coupled to said control circuit board by a backplane connector including at least one first flexible, substantially laminar connector, wherein said touch sensing layer is coupled to said control circuit board by a sensor connector including at least one second flexible, substantially laminar connector, wherein said control circuit board is mounted behind said flexible display structure in said housing, wherein at respective points of attachment of said at least one first and second laminar connectors to said control circuit board each said laminar connector has a plurality of electrical connections running along a longitudinal direction of the laminar connector and disposed alongside one another in a transverse direction across the laminar connector, and wherein, at said respective points of attachment of said at least one first and second laminar connectors to said control circuit board, the longitudinal directions of said laminar connectors are aligned such that, when said device is flexed, a relative displacement in said longitudinal direction between said control circuit board and of said display structure is able to be tolerated.

In embodiments by aligning the connections of the first and second laminar connectors, which may for example be flexible printed circuit boards, when the device is flexed there is tolerance for a relative lateral displacement in the aligned longitudinal directions of the connectors between the control circuit board and the combination of the display screen, backplane, and touch sensing layer which, in embodiments, are laminated together.

In embodiments the touch sensing layer is electrically connected to the control circuit board at a maximum of two opposite edges of the control circuit board; the display screen may be electrically connected to the control circuit board at two opposite sides or three sides of the control circuit board, to provide row and column (gate select and data) connections to the display. In embodiments of the device the connections to the touch screen are made at the first pair of opposite sides of the control circuit board and connections to the display screen are made at a second, different pair of opposite sides of the control circuit board orthogonal to the first pair (and also on a third side). To achieve the desired longitudinal alignment when assembled, a connection to one of the touch sensing layer and display screen includes a 90° turn, achieved within the very thin housing by a fold in the laminar connector, and thus the longitudinal directions of the laminar connectors at the control circuit board are all aligned along a common longitudinal direction. In this way flexing of the device can be tolerated without substantial stress on the connections to the control circuit board.

In embodiments each of the backplane and sensor connectors includes a substantially 180 degree turn, preferably in a different part of the connector to the laminar connector (which, in embodiments, is a flexible printed circuit board). This helps to provide flex-tolerance and facilitates assembly. In embodiments the laminar connectors have one or two further folds to turn the longitudinal director of the contacts through 90 and 180 degrees respectively. This enables laminar connectors connecting to three or all four sides (edges) of the control PCB all to be longitudinally aligned, again important for flex-tolerance.

The large area touch screen presents special problems, in particular when using projected capacitance touch sensing which typically employs an XY array of thin wires projecting an electric field beyond the display screen: because the touch sensing layer is in front of the display screen the electrodes should be substantially transparent, for example fabricated using indium tin oxide, but with a large screen the resistance of the tracks becomes significant, especially if fine spatial resolution (and hence narrow lines) is desired since increasing the thickness of the long electrode lines can result in the touch sensing electrodes becoming visible, even when covered with a refractive index matching material. Still further, the above described electronic document reading device architecture requires connections to opposite sides of the control circuit board, whereas connections need to be made to both row and column electrodes of the touch sensing layer, that is along orthogonal edges of this layer. A still further complicating factor is that relatively long connections can introduce an undesirable level of noise.

In embodiments of the device therefore (in particular those with a large screen) these problems are addressed by dividing the touch sensing layer into two, for example left and right or top and bottom portions of the display surface, and making separate connections between each of these two halves of the display screen and local touch sensing circuits, for example integrated circuits, for example integrated circuits, the touch sensing circuit for each half of the touch sensing layer being located physically close to the touch sensing layer and connecting to both the row and column electrodes of the relevant portion of the layer. The two touch sensing circuits for the two portions of the touch sensing layer may then each themselves connect to the control circuit board, at opposite sides of the control circuit board, using a relatively lower number of connections, over a longer distance than the connections directly to the row/column electrodes themselves. In this way the lengths of the electrolines on the display are shortened, the lengths of the connections to the row and column electrodes are shortened, and connections to the combination of the touch sensing layer and touch sensing circuits are made at a maximum of two apposite sides of the touch sensing layer (over longer but more noise resilient connections). In embodiments each of the touch sensing circuits is mounted on a flexible printed circuit board which connects to the row and column electrodes of a respective portion, for example one half, of the touch sensing layer and which also (at an opposite end) connects to the control circuit board via one or more flexible 180 degree turns as previously described, for example implemented using a separate part of the connector to the flexible printed circuit board. Such an arrangement addresses the aforementioned problems and facilitates the provision of a touch sensing display screen for devices with an active display area having a diagonal dimension of at least 20 cm, 25 cm or 30 cm. However in other arrangements a single touch screen may be employed.

In embodiments the active matrix backplane is coupled to the control circuit board at locations adjacent edges of the active matrix backplane, at a maximum of two opposite edges of the active matrix backplane, despite connections being made to row and column driver electrodes of the backplane. In embodiments the edges of the backplane to which connections are made are edges aligned parallel to the aforementioned longitudinal directions of the aligned connectors at the control circuit board.

As previously mentioned, in embodiments the display/backplane is mounted on a flexible substrate, more particularly a plastic substrate, for example a thin sheet of PET (polyethyleneterephthalate) or PEN (polyethylenenaphthalate). Preferably the backplane is fabricated using solution-based thin film transistors (TFTs) preferably patterned by techniques such as direct-write printing, laser ablation or photolithography. Further details can be found in the applicant's earlier patent applications, including, in particular, WO 01/47045, WO 2004/070466, WO 01/47043, WO 2006/059162, WO 2006/056808, WO 2006/061658, WO 2006/106365 (which describes a four or five layer pixel architecture) and PCT/GB2006/050265, all hereby incorporated by reference in their entirety. Thus in embodiments the TFTs comprise an organic semiconductor material, for example a solution processable conjugated polymeric or oligomeric material, and in embodiments the display, more particularly the backplane, is adapted to solution deposition, for example comprising solution-processed polymers and vacuum-deposited metals.

Preferred embodiments of the electronic document reading device architecture comprise an intermediate or mid-frame plate between the control circuit board and the active matrix backplane, the backplane being laminated to the frame plate, the control circuit board being flexibly mounted on the frame plate, for example by adhesive pads. In embodiments the frame plate has one or more datums to hold the frame plate in fixed alignment to the housing. In embodiments the frame plate is metal, for example aluminium, stainless steel or spray steel, although carbon fibre or fibreglass may alternatively be employed.

Laminating the frame plate to the back of the display helps to control bend in the flexible display, in particular substantially preventing kinks forming. This is particularly important, for example, in limiting the damage caused by an impact, for example from dropping the device on the floor—the mid-frame deforms but controls the bend. In embodiments the thickness of the mid-frame plate is less than 1 mm, more preferably less than 0.6 mm, preferably greater than 0.1 mm. The use of a metal frame plate is particularly advantageous when an electrophoretic display is employed as such displays are particularly sensitive to thermal gradients. A thermally conductive metal plate can shield the display from the electronics and other components behind; without such a shield "shadows" of the electronic components can be visible. The use of a conductive frame plate has the additional advantage of providing a ground plane for the control electronics, and in such a case the adhesive pads mounting the control circuit board may be electrically conductive, to provide an electrical connection to this ground plane. By employing a plurality of datums at which the frame plate is attached in fixed alignment to the housing the frame plate helps to impart structural rigidity to the housing, which is important in a very thin device. Thus in embodiments the frame plate acts as a structural component rather than a floating member. Preferably such points of attachment are outside the active area of the display. In embodiments the control circuit board and frame plate share a common datum, for example a pin through the printed circuit board and mid-frame, in particular at the location of an external connector such as a micro USB connector, again to provide stress relief in the event that the connector is shock loaded, for example by dropping the device.

In embodiments the control circuit board is generally L-shaped, the connectors for the touch sensing layer and display screen making contact adjacent edges of the control circuit board, the L-shape reducing the length of connections required. Because the control electronics need not occupy the complete rectangular area behind the display a cut-out in this rectangular area defining the L-shape is used, in embodiments as a location for flat, thin battery. However in other arrangements the control circuit board may be rectangular.

In embodiments the device has a lateral diagonal dimension of at least 25 cm and a thickness of no greater than 9 mm, preferably no greater than 8 mm. In embodiments the device is even thinner at its perimeter, for example no thicker than 6 mm or 5 mm. This presents significant problems in providing a removeable rear cover for servicing and the like. In embodiments the device has a removable rear panel extending over the majority of a rear face of the housing, attached to the housing by stretch-release adhesive tape, for example between an interior surface around the perimeter of the rear panel and an interior ledge of the housing. The use of stretch-release tape provides a method of removing the rear panel, especially of a large area device, without unduly bending the panel—the tape is pulled longitudinally to release the adhesion. This can be performed along one, two or more edges of the panel, which may then be gently peeled off. Preferably, therefore, a gutter or similar recessed or "hidden" access is provided at least partially around the rear face of the housing to provide a location for a pull-tab for the stretch-release adhesive tape. In this way a removable rear cover can be provided for servicing whilst retaining an extremely thin overall device thickness at the perimeter.

In some preferred embodiments of the device the display is an electrophoretic display. However it has been found in practice that the slow response of such a display to operation of a user control can cause problems with device operation, especially when a user operates a control multiple times in an attempt to achieve the desired effect. In some preferred embodiments of the device, therefore, the control electronics is configured to control an optical illumination device, for example a light emitting diode, to provide substantially instant optical feedback to a user on operation of a user control, to enable the user to discern that a command had been given and that the response of the device should be awaited. In some preferred embodiments a portion of the plastic perimeter of the device is transparent and configured to guide light from at least one illumination source to light a potion of the edge of the device in the vicinity of the user control, in embodiments a capacitive touch sensor.

In a related aspect, therefore the invention provides a flex-tolerant electronic document reading device, the device comprising: a pixellated electrophoretic display screen; an active matrix backplane bearing a plurality of pixel driver circuits for driving pixels of said display screen, said active matrix backplane having a flexible plastic substrate, said display screen being mounted on said active matrix backplane; a touch sensing layer mounted over a display surface of said display screen to sense an X-Y touch position on said display screen; a control circuit board mounting control electronics for the electronic document reading device; a flex-tolerant housing for said display screen, active matrix backplane, touch sensing layer and control circuit board; and further comprising a user control operatively connected to said control circuit board to control display of information on said electrophoretic display screen and an illumination device, wherein a perimeter of said housing is configured to conduct light from said illumination device to a side or edge of said housing, and wherein said control electronics is configured to control said illumination device in response to user operation of said user control to provide substantially instant optical feedback to a user of the device on operation of said user control to compensate for a delay time in a response of said electrophoretic display screen to said operation of said user control.

In a further related aspect the invention provides a flex-tolerant electronic document reading device, the device comprising: a pixellated flexible display screen; a flexible active matrix backplane laminated onto said display screen and configured to drive pixels of said display screen, said active matrix backplane having a plastic substrate; a control circuit board mounting control electronics for said electronic document reading device; a flex-tolerant housing for said display screen, active matrix backplane and control circuit board; and further comprising a frame plate located between said active matrix backplane and said circuit board, said frame plate extending over and beyond an active area of said display screen; wherein said combination of said flexible active matrix backplane and said display screen is laminated onto said frame plate, wherein said frame plate has at least one frame plate datum point, and wherein said frame plate is attached to said housing at said at least one frame plate datum point to hold said frame plate in fixed alignment with said housing and to stiffen said combination of said flex-tolerant housing and said flexible active matrix backplane and display screen.

The invention still further provides a flex-tolerant electronic document reading device, the device comprising: a pixellated flexible display screen; a flexible active matrix backplane laminated onto said display screen and configures to pixels of said display screen, said active matrix backplane having a plastic substrate; a control circuit board mounting control electronics for said electronic document reading device; a flex-tolerant housing for said display screen, active matrix backplane and control circuit board; wherein said housing has a removable rear panel with a gutter between an edge of said removable rear panel and an edge of said housing, wherein the device has a lateral diagonal dimension of at least 25 cm and a thickness of no greater than 9 mm, and wherein said removable rear panel is attached to said housing by stretch release adhesive tape having a pull tab located in said gutter.

Preferably the device includes a frame plate further comprising a frame plate located between the active matrix backplane and the control circuit board, the frame plate extending over and beyond an active area of the display screen, wherein the combination of the flexible active matrix backplane and the display screen is laminated onto the frame plate, wherein the frame plate has at least one frame plate datum point and wherein the frame plate is attached to the housing at the at least one frame plate datum point to hold the frame plate in fixed alignment with the housing, wherein the active area of the display screen has a diagonal dimension of at least 20 cm, wherein the electronic document reading device has a thickness of no greater than 9 mm, and wherein the frame plate is attached to the housing at a plurality of positions around the perimeter of the frame plate outside the active area of the display screen, wherein the device has a thickness of no greater than 6 mm at a perimeter of the device, wherein the housing has a removable rear panel extending over substantially a substantially complete rear face of the housing. In embodiments the removable rear panel is attached to the housing at edges of the rear panel adjacent said perimeter of the device by stretch release adhesive tape between an interior surface of the rear panel and an interior ledge of the housing (although the use of stretch-release tape is not essential).

In a still further aspect the invention provides a flex-tolerant electronic document reading device, the device comprising: a pixellated flexible display screen; a flexible active matrix backplane laminated to said display screen, said active matrix backplane having a flexible plastic substrate bearing a plurality of pixel driver circuits for driving pixels of said display screen; a projected capacitance touch screen sensor laminated over said flexible display screen; an intermediate metal frame laminated to said active matrix backplane; and a control circuit board mounted on a rear of said metal frame; and wherein said touch screen sensor is electrically connected to said control circuit board at a maximum of two opposite sides of said control circuit board.

In embodiments the display screen is electrically connected to the control circuit board of a maximum of two opposite sides of a control circuit board, and, at the control circuit board, the electrical connections to the touch sensor and display screen are all aligned along a common longitudinal direction to permit relative longitudinal movement between the control circuit board and the intermediate metal frame mounting the active matrix backplane, display and touch screen sensor.

In a still further aspect the invention provides a flex-tolerant electronic document reading device, the device comprising: a flexible display structure comprising: a transparent front panel, a pixellated flexible display screen behind said front panel, an active matrix backplane bearing a plurality of pixel driver circuits for driving pixels of said display screen, said active matrix backplane having a flexible plastic substrate, said flexible display screen being mounted on said active matrix backplane, and a touch sensing layer mounted over a display surface of said display screen and behind said front panel to sense an X-Y touch position on said display screen; a control circuit board carrying control electronics for the electronic document reading device; and a flex-tolerant housing for said display structure and control circuit board; wherein said flex-tolerant housing comprises a one-piece front portion mounting said flexible display structure and defining a substantially planar front of said electronic document reading device, and lateral sides of said electronic document reading device, and a removeable rear panel, wherein said rear panel of said electronic document reading device defines a curved rear surface such that a front-back thickness of said electronic document reading device tapers towards said lateral sides, wherein said front position of said housing is formed from a transparent plastic, and wherein said transparent plastic has an opaque interior surface which extends around a lateral border of said display screen and which wraps around to internal side walls of said lateral sides of said electronic document reading device such that a combination of said front-back thickness taper and said opaque internal surface behind said transparent sides and front of said housing gives an illusion of said electronic document reading device being thinner than a physical thickness of said electronic document reading device defined by said rear surface.

There are special problems in achieving a thin, flex-tolerant electronic document reading device. Embodiments of the above described technique facilitate achieving an appearance of extreme thinness, especially in the context of the previously described architecture, which also facilitates the production of a thin, flexible device. Thus in embodiments the device has a lateral diagonal dimension of at least 25 cm and a physical thickness at the lateral sides of less than 7 mm, in embodiments less than 5 mm. A raised portion or "doghouse" on one side may be employed to provide a connector portion for the device. In embodiments the device has a maximum physical thickness of no greater than 9 mm; embodiments the transparent front panel has a thickness of no greater than 0.3 mm. The edges of the removeable rear panel may be lower than (lie beneath) the rear edges of the front portion of the housing to further sustain the illusion; optionally a gap is provided between a lateral edge of the rear panel and a lateral side wall of the front, transparent portion of the housing. In embodiments the opaque interior surface may be provided by a black pigment, deposited on the interior surface.

Although some embodiments of the electronic document reading device use an electrophoretic display, in other versions of the device an electrowetting-type display may be employed, for example of the type available from Liqua Vista By (see, for example, R A Hayes and B J Feenstra, Nature 425, 383 (2003); and WO03/071346).

BRIEF DESCRIPTION OF THE DRAWINGS

These and other sects of the invention will now be further described by way of example only, with reference to the accompanying figures in which:

FIGS. 1a to 1c show, respectively, a front, display face view, a rear view, and a vertical cross-section view of an electronic document reading device;

FIG. 2 shows a detailed vertical cross-section through a display portion of the device of FIG. 1;

DETAILED DESCRIPTION OF PREFERRED EMBODIMENTS

Figure 3A:
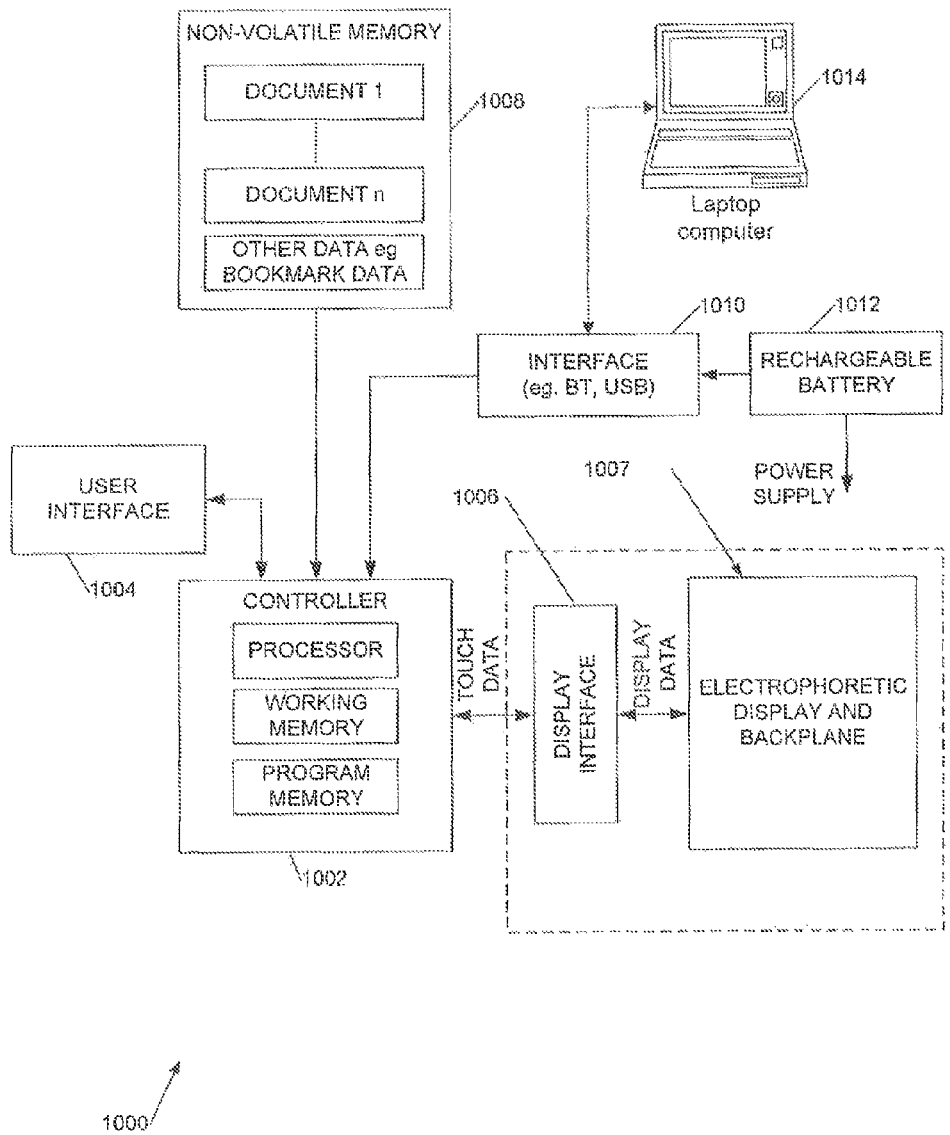
FIGS. 3a and 3b show, respectively, a block diagram of control circuitry of an electronic document reading device according to an embodiment of the invention, and details of connections to a touch sensing layer of the device.

Referring to FIGS. 1a to 1c, these schematically illustrate an electronic document reading device 10 having a front display face 12 and a rear face 14. As can be seen from FIG. 1c, in preferred embodiments the display surface 12 is substantially flat to the edges of the device, and in particular may lack a display bezel. In some implementations the electronic (electrophoretic) display does not extend right to the edges of the display surface 12, and rigid control electronics are incorporated around the edges of the electronic display—this approach can reduce the overall thickness of the device and thus facilitating flex-tolerance, at the expense of making the overall area of the device slightly larger.

Referring now to FIG. 2, this illustrates a vertical cross-section through a display region of the device between the frame members 16. The drawing is not to scale.

As can be seen, in preferred embodiments the device has a substantially transparent front panel 100, for example made of Perspex®, which acts as a structural member. The active matrix pixel driver circuitry layer 106 may comprise an array of organic or inorganic thin film transistors as disclosed, for example, in WO01/47045. Such a front panel is not necessary and sufficient physical stiffness could be provided, for example, by the substrate 108 optionally in combination with one or both of the moisture barriers 102, 110.

The illustrated example of the structure comprises a substrate 108, typically of plastic such as PET (polyethylene terephthalate) on which is fabricated a thin layer 106 of organic active matrix pixel driver circuitry. Attached over this, for example by adhesive, is an electrophoretic display 104, although alternative display media such as an organic LED display medium or liquid-crystal display medium may also be used. A moisture barrier 102 is provided over the electronic display 104, for example of polyethylene and/or Aclar™, a fluoropolymer (polychlorotrifluoroethylene-PCTFE). A moisture barrier 110 is also preferably provided under substrate 108: alternatively this may be incorporated into the metal midframe. Since this moisture barrier does not need to be transparent preferably moisture barrier 110 incorporates a metallic moisture barrier such as a layer of aluminium foil. This allows the moisture barrier to be thinner, hence enhancing overall flexibility.

In preferred embodiments the display medium is a reflective display medium, in particular an electrophoretic display medium and the backplane comprises a flexible substrate such as PET or PEN (polyethylene naphthalene). Preferably the backplane is fabricated using solution-based transistors preferably patterned by techniques such as direct-write printing, laser ablation or photolithography. Further details can be found in the applicant's earlier patent applications, including, in particular, WO 01/47045, WO 2004/070466, WO 01/47043, WO 2006/059162, WO 2006/056808, WO 2006/061658, WO 2006/106365 and PCT/GB2006/050265, all hereby incorporated by reference in their entirety.

Approximate example thicknesses for the layers are as follows: 100 μm for moisture barrier 110, 200 μm for substrate 108, 5-6 μm for active layer 106, 190 μm for display 104, and 200 μm for moisture barrier 102. The set of layers 102-110 form an encapsulated electronic display 112; preferably this is bonded, for example by adhesive, to a transparent display panel 100. The front panel 100 may have a thickness in the range 0.1-2 mm, for example approximately 0.2 mm. This provides a hard window and an anti-glare function.

As illustrated, electrode lines 101 (such as ITO lines) for touch sensing are located behind the front panel of the device. For example a set of transparent touch screen electrodes may be laminated onto the display medium and display backplane (using a pressure sensitive adhesive). An electrode layer may be a conductive polymer or a metallic layer such as copper, nickel, gold or silver or printable metal. The layer may be deposited using techniques such as vacuum deposition, electroplating and printing techniques, such as screen printing. An intermediate insulating layer may be deposited by techniques such spray or blade coating or printing techniques. Connections to the electrode layers may be formed, for example, mechanically, say with the aid of an adhesive, or through a welding or soldering process.

Embodiments of the device thus incorporate a capacitive touch sensitive electrophoretic display, preferably a projected capacitance touch sensitive electrophoretic display. This may be used to identify gestures for selecting documents and/or pages, turning pages forward and back and the like. In embodiments the touch sense processing may be such that gestures are location/orientation agnostic, so that a user may perform the same gesture at any location to produce the same result and, in embodiments, independent of orientation (portrait or landscape) of the device. In such embodiments, documents may also be electronically "marked-up", with mark-up data being written to or being associated with the electronic document being displayed. Additional user controls, optionally also touch sensitive, may be provided in the border around the active display region.

In embodiments, the electronic document reader has connectors located along an edge of the device to enable the device to be connected to other electronic devices, such as a laptop or desktop computer, a PDA (Personal Digital Assistant), a mobile phone or 'smart' phone, or other such devices. A micro USB (universal serial bus) connector and wireless interfaces are provided with to enable documents to be transferred to and from the electronic document reader. In embodiments three wireless interfaces are provided, each with a corresponding antenna, a Bluetooth™ interface, a WiFi interface and a 3G/4G mobile phone compatible interface.

Referring next to FIG. 3a, this shows a block diagram of control circuitry of an electronic document reader 1000.

The electronic document reader 1000 comprises a controller 1002 including a processor, for example an ARM (Registered Trade Mark) device, working memory and programme memory, coupled to a user interface 1004. The controller 1002 is also coupled to an active matrix backplane and electrophoretic display 1007 by a display interface 1006, for example implemented as an FPGA (Field Programmable Gate Array) or ASIC (Application Specific Integrated Circuit), to send electronic document data to the display 104 and to receive touch-sense data from the display. The control electronics also includes non-volatile memory 1008, for example Flash memory, for storing data for one or more documents for display and, optionally, other data such as user bookmark locations and the like. An external wired or wireless interface 1010, for example USB and/or Bluetooth™, is provided for interfacing with a computer such as a laptop 1014, PDA, or mobile or 'smart' phone to receive document data and, optionally, to provide data such as user bookmark data. A rechargeable battery 1012 or other rechargeable power source is connected to interface 1010 for recharging, and provides a power supply to the control electronics and display.

Figure 3B:
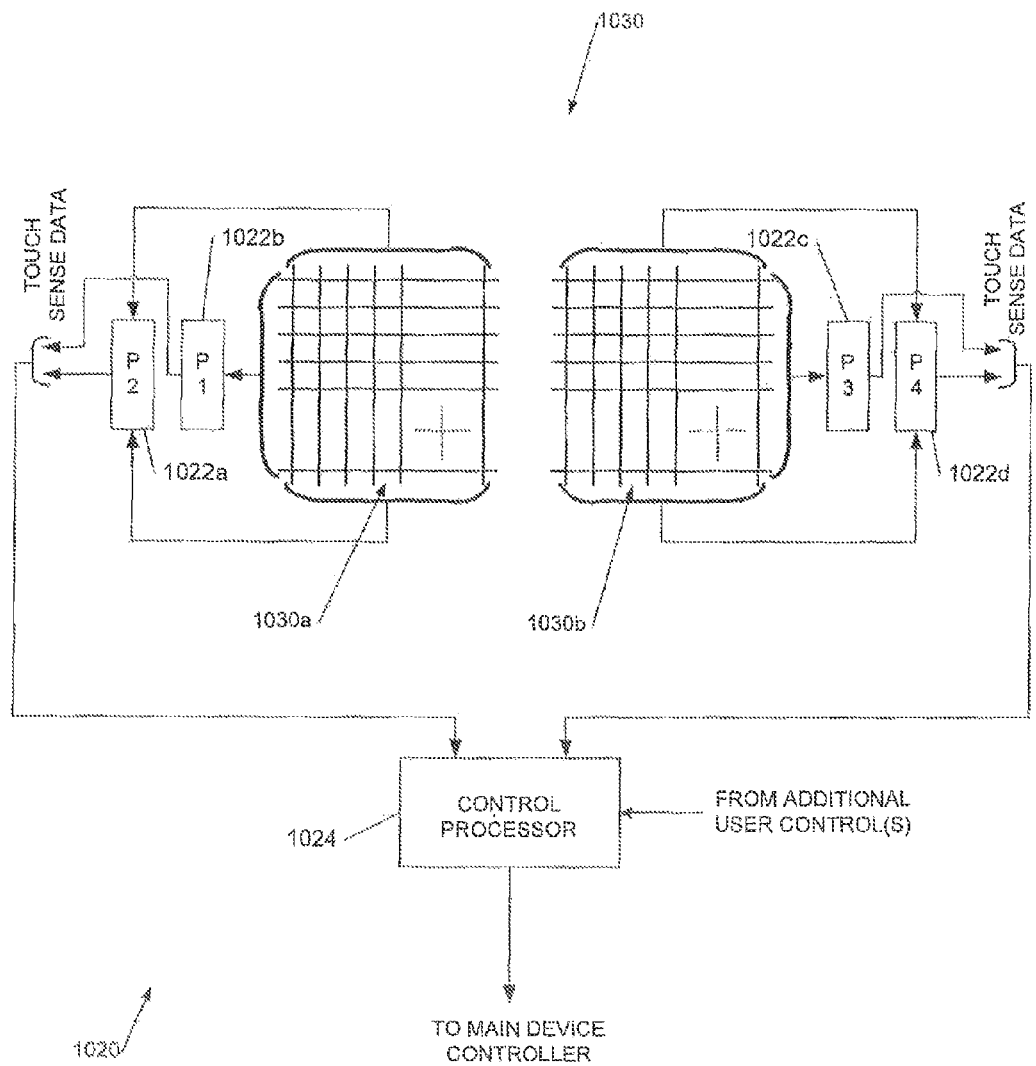

FIG. 3b shows details of an example of a projected capacitance touch screen sensing system 1020.

The touch sensing layer 1030 of the display comprises a plurality of transparent ITO row and column electrodes. Each of the row electrodes is divided in the middle by a break in electrical conductivity into two portions, thereby dividing the touch sensing layer into two touch sensing regions 1030a,b, for example covering left and right portions of the display. Optionally the column electrodes are likewise divided into two portions. The "half electrode lines" on each side 1030a,b of the sensor array are each connected to a respective touch sensing circuit, in embodiments implemented by PSoCs 1022a-d (Programmable System-on-Chip, PSoC (Registered Trade Mark) microcontroller devices are available for example from Cypress Semiconductor Corporation). For example, the touch sensing circuits may each comprise a CY8C24x94 device, using the Cypress™ slider library to provide sub-sensor resolution. As illustrated touch sensing processors P1 and P2 perform X-Y processing for the left half of the touch screen and processors P3 and P4 the touch sense processing for the right half of the touch screen. Advantageous techniques for processing the signals from these devices are described in our co-pending UK patent application entitled "Touch Screen Displays" [filed on the same day as this application—to be filed]. One advantage to segmenting the sensor array in this way is that a thinner ITO layer can be employed since the architecture can cope with an increased ITO resistance, thus improving optical clarity. Another is that because the sensing is split across four PSoCs separate connections can be made to each half of the touch sensing layer, which in turn enables a flex-tolerant device architecture, as described further later.

In an example embodiment each of the touch sensing circuits 1022a-d is connected via an I2C serial bus to a control processor 1024 (for example an AVRmega48 device from Atmel (Registered Trade Mark) Corp, which includes on-chip Flash, RAM, and EEPROM), providing individual poll and acknowledge lines. The processor 1024 and polls the processors P1-4 to start a scan, handles merging of the X and Y coordinates from P1-4, performs stroke and gesture recognition and can accommodate inputs from one or more separate user control buttons (eg a "home" button), which may be implemented using capacitance sensors: external input(s) may also be provided. Processor 1024 may also perform power-control/wake-up functions. Processor 1024 reports X and Y position data, strokes and gestures to the main processor/controller 1002, in embodiments at a 50 Hz rate over an SPI bus. The main processor/controller 1002 processes the gesture information using a tablet input device driver of an operating system such as WinCE™. In embodiments it is configured to enable a user to write on the display with a stylus, processing this data and providing it to the display for annotation of a document.

Figure 4:
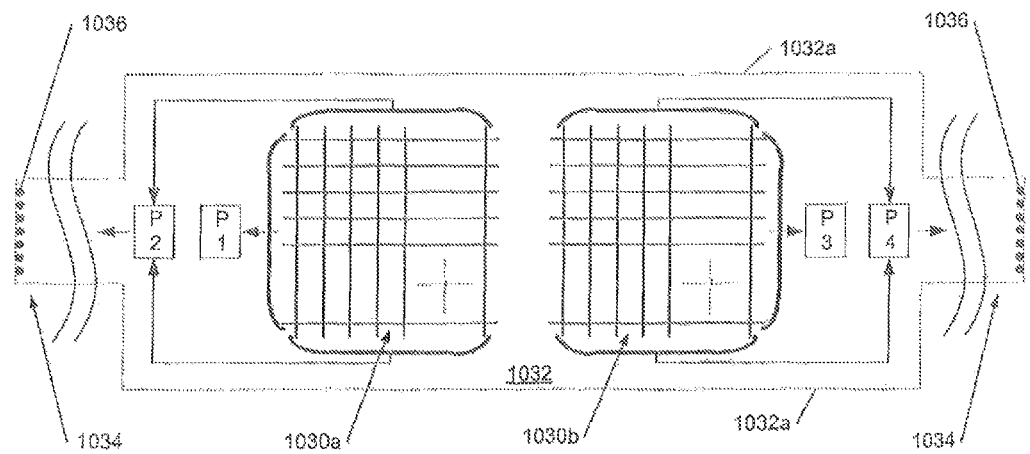
FIG. 4 shows a physical layout of the touch screen sensor and associated sensing circuits and connectors.

Referring now to FIG. 4, this shows a physical layout of the touch sensing circuit and connections to the main, control circuit board. In FIG. 4 like elements to those of FIG. 3b are indicated by like reference numerals. The dashed line 1034 indicates the outline of a flexible printed circuit board 1032 on which the touch sensing circuitry including processors P1-P4 is mounted. The flexible PCB has a tab 1034 at either end (shown shortened for convenience), and a set of connections 1036, for example soldered connections, is provided at the end of each tab for connecting the touch sensing circuitry to the main control circuit board. The physical arrangement of FIG. 4 enables the touch sense circuitry to be physically located close to the touch sensing electrodes and provides a low pin count for the connection to the main control circuit board.

Figure 5:
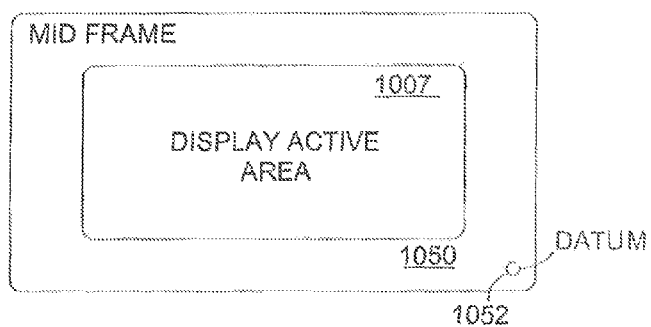
FIG. 5 shows a simplified plan view of a display and mid-frame of the device.

FIG. 5 shows a simplified plan view of the display, including the active matrix backplane and touch sensing layer laminated to a mid-frame 1050, for example 0.5 mm thick aluminium. As illustrated, the mid-frame extends laterally beyond the display active area and one or more datums 1052, for example for a fixing pin, are provided in the mid-frame outside the active display area. These are used for the alignment of plastic elements of the device. The mid-frame is a good thermal conductor and thus helps to conceal the thermal signatures of the components on the control circuit board, battery and wireless connection module(s), which is important as electrophoretic displays are very susceptible to temperature variations. The mid-frame provides impact and kink-protection for the flexible display screen, whilst allowing the device some flex; the datum 1052 aligns the flexible mid-frame and display combination with the (plastic) housing (not shown) and also acts as a structural support member for the housing, which is important in a very thin device of the type we describe. In embodiments the maximum front-back thickness of the device is less than 8 mm and the thickness at the edges of the device is less than 5 mm. The mid-frame maintains alignment of components of the display, even when flexed, and also helps to manage the effects of temperature variation, which are significant with plastic components.

Conveniently the mid-frame is also able to provide a ground plane for the control circuit board.

Figure 6A:
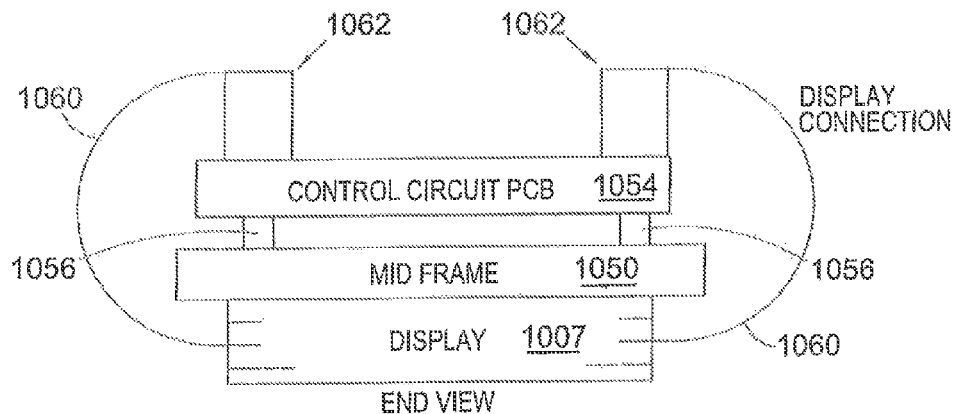
FIG. 6a-6c show, respectively, end and side cross-sectional views of the device showing flexible connections to a control circuit board and a view from above of the device architecture.
Figure 6B:
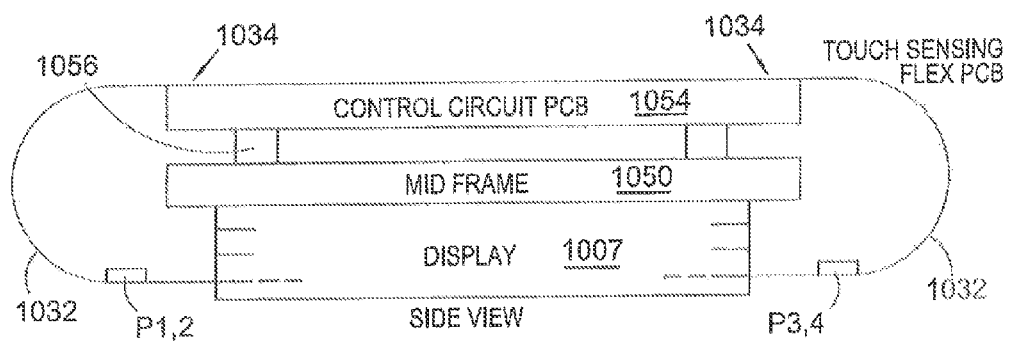
Figure 6C:
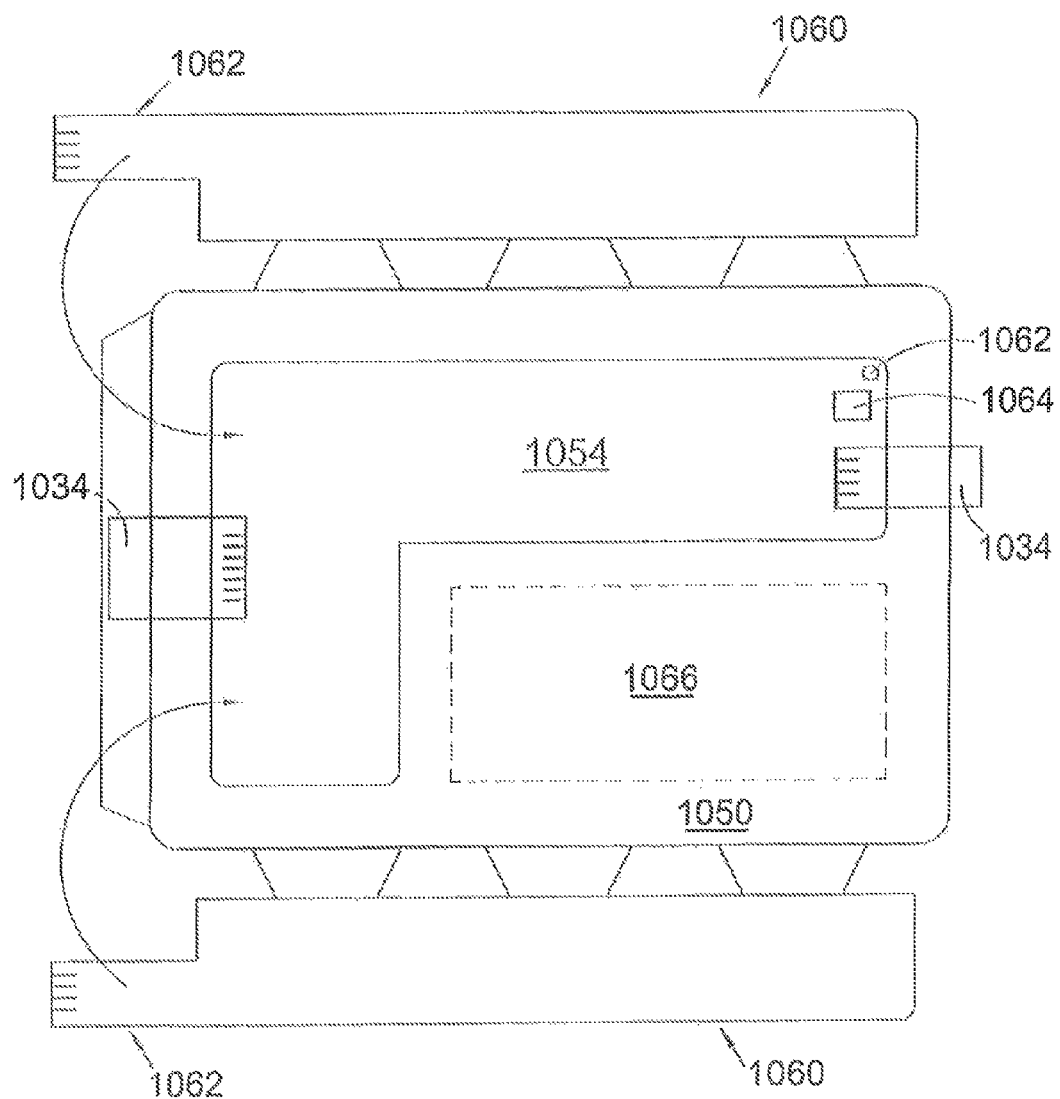

Referring now to FIGS. 6a and 6b these show, respectively, an end cross-section view and a side cross-section view (both simplified), illustrating, conceptually, flexible connections between the display (including backplane and touch sensing layer) 1007 and the control circuit board 1054. The control circuit board is flexibly mounted to the mid-frame 1050 by electrically conductive adhesive pads 1056, enabling some movement between the control circuit board and mid-frame. Referring to FIG. 6b, the flexible connector 1032 can be seen in cross-section, mounting the processors close to the touch sensing electrodes to minimise susceptibility to noise. Likewise the control circuit PCB 1054 extends substantially to the edge of the display 1007 so that the flexible connectors 1032 can be also be short. Referring to FIG. 6a, this shows, conceptually, a second pair of flexible connectors 1060, including a flexible printed circuit board portion, used to connect the display drive circuitry on the control PCB 1054 with the electrophoretic (or other) display to be driven. The flexible printed circuit boards of the display connectors 1060 have an additional fold (or folds) 1062, to turn the longitudinal orientation of the connector flexible PCB through 90° (or 180°) before connection to the control circuit PCB 1054. FIG. 6c shows a view from above of the electronic document reading device illustrating in plan view how the connections to the control circuit PCB are made. The connections 1060 to the active matrix backplane for driving the display are also shown.

Figure 7:
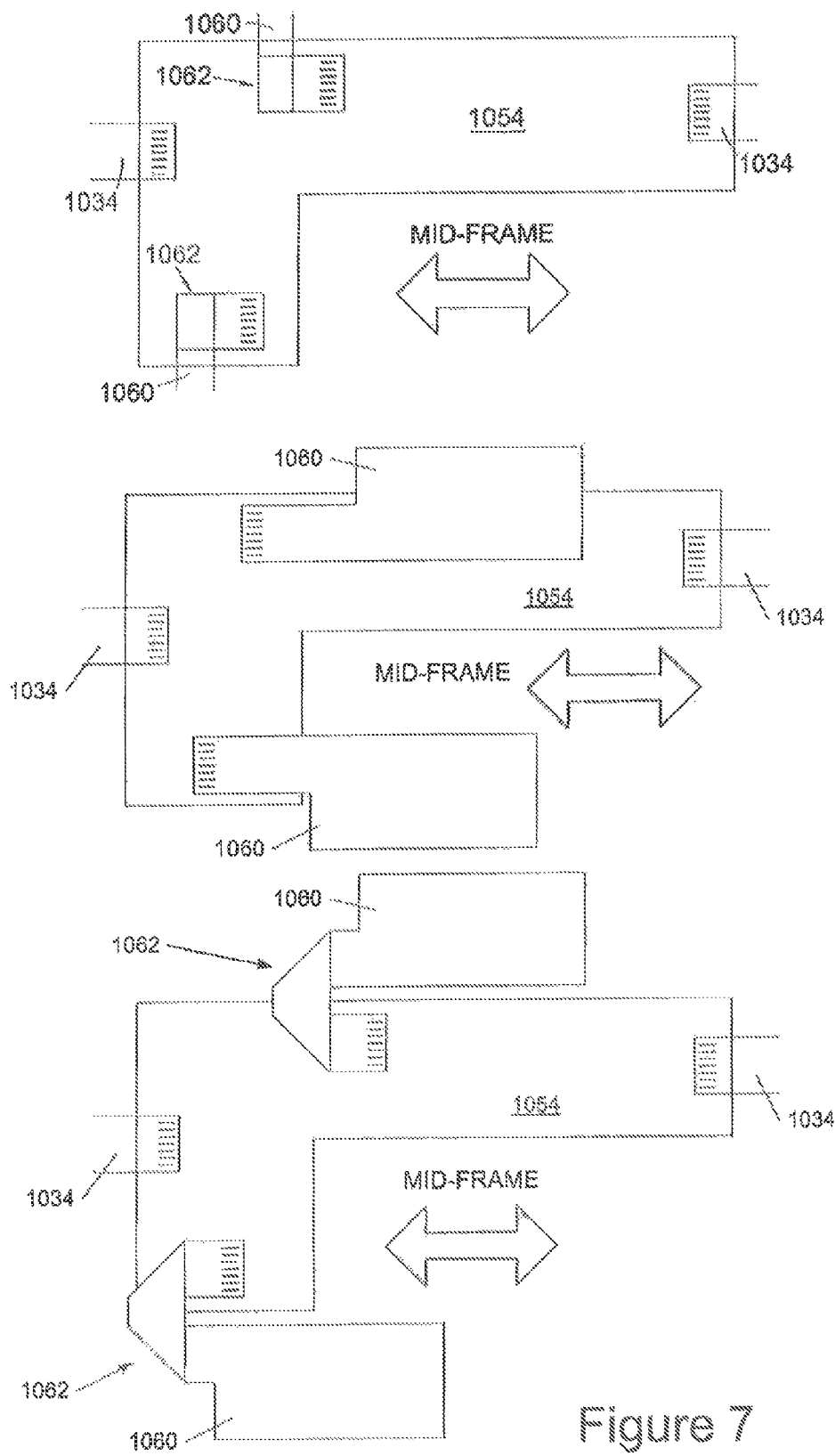
FIG. 7 illustrates, conceptually, one aspect of flex-tolerance of the device.

FIG. 7 illustrates the concept of the flex-tolerant connections for different connection configurations, showing how relative longitudinal motion between the control circuit PCB and underlying mid-frame to which the display is mounted can be tolerated. All the connectors to the display are on "one axis" so that the PCB can move side to side with respect to the display. Such an arrangement also allows for differential motion between the components. Such problems do not arise with a display on a glass substrate.

Referring again to FIG. 6c, it can be seen that the control circuit board 1054 is generally L-shaped. This allows all the connections between the circuit board and the display to be relatively short, hence minimising noise, and also provides space for a battery 1066 within the thickness of the device. The L-shaped PCB is important for a device with a large touch screen, for example of approximately A4 size. FIG. 6c also illustrates that one preferred location for a datum 1052 is adjacent a micro USB connector 1064, to provide shock loading stress transfer between the control circuit board, mid-frame and housing. Although not illustrated in FIG. 6c, the mid-frame 1050 does not extend completely to one internal end of the housing to leave space for 1 or more RF antennas, for example for a 3G mobile connection and/or Wifi and/or Bluetooth™.

Figure 8A:
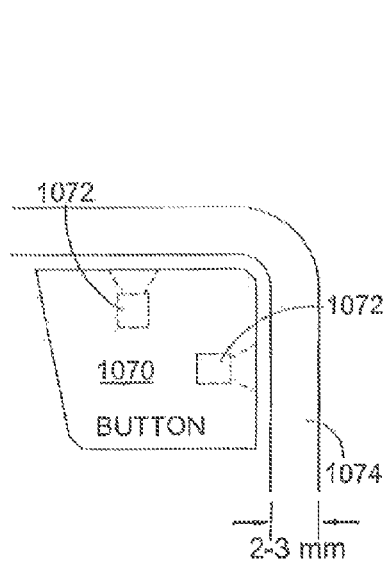
FIGS. 8a and 8b illustrate a touch sensitive user control with light-guided optical feed back.
Figure 8B:
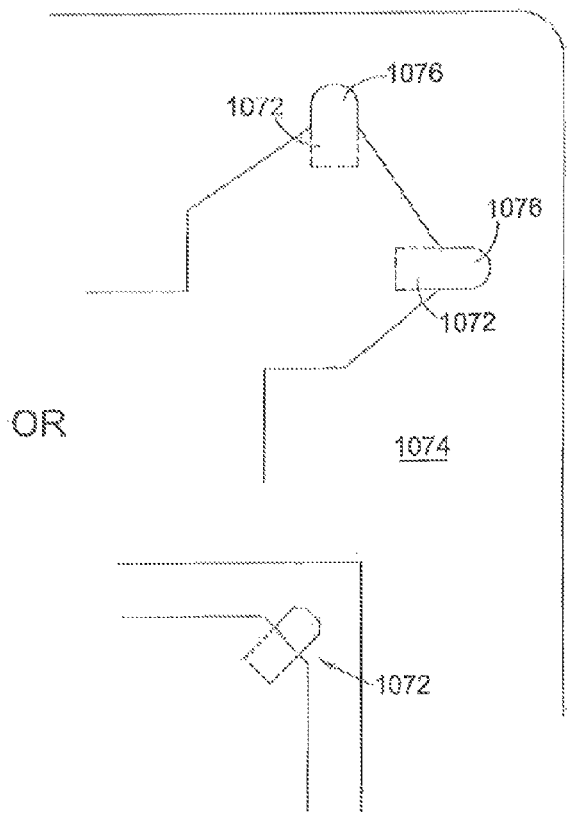

FIGS. 8a and 8b illustrate a user control of the device, in embodiments a capacitive sensor (sensing button) 1070 part of user interface 1004 of FIG. 3a. Electrophoretic displays are relatively slow to respond and this can cause problems when users press the button repeatedly because of the display response time. In embodiments, therefore, a pair of light emitting diodes 1072, also part of user interface 1004, is provided to present a user with instant optical feedback of operation of (mechanical or capacitance sensing) button 1070. As conceptually illustrated in FIG. 8a, in some preferred embodiments these couple light into a transparent or translucent perimeter 1074 of a bezel or frame portion of the housing, so that the perimeter of the housing adjacent the button is illuminated when the button is actuated. FIG. 8b shows the light guiding in more detail: an internal surface of the housing is configured as a light guide/pipe 1076 to collect the light from LEDs and pipe this through an internal bezel or frame portion or directly to illuminate the edge of the device. The inset to FIG. 8*b* shows an alternative configuration.

Figure 9A:
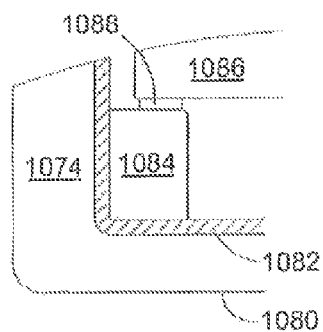
FIGS. 9a to 9c show, respectively, a view of an edge of the device, a partial simplified cross-sectional view through an edge of the device showing a removable rear panel, and a front housing portion of an embodiment of the device.
Figure 9B:
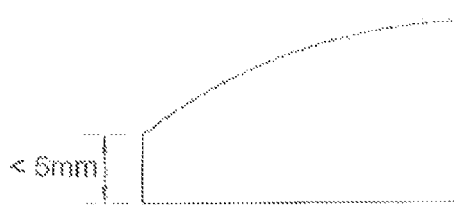
Figure 9C:
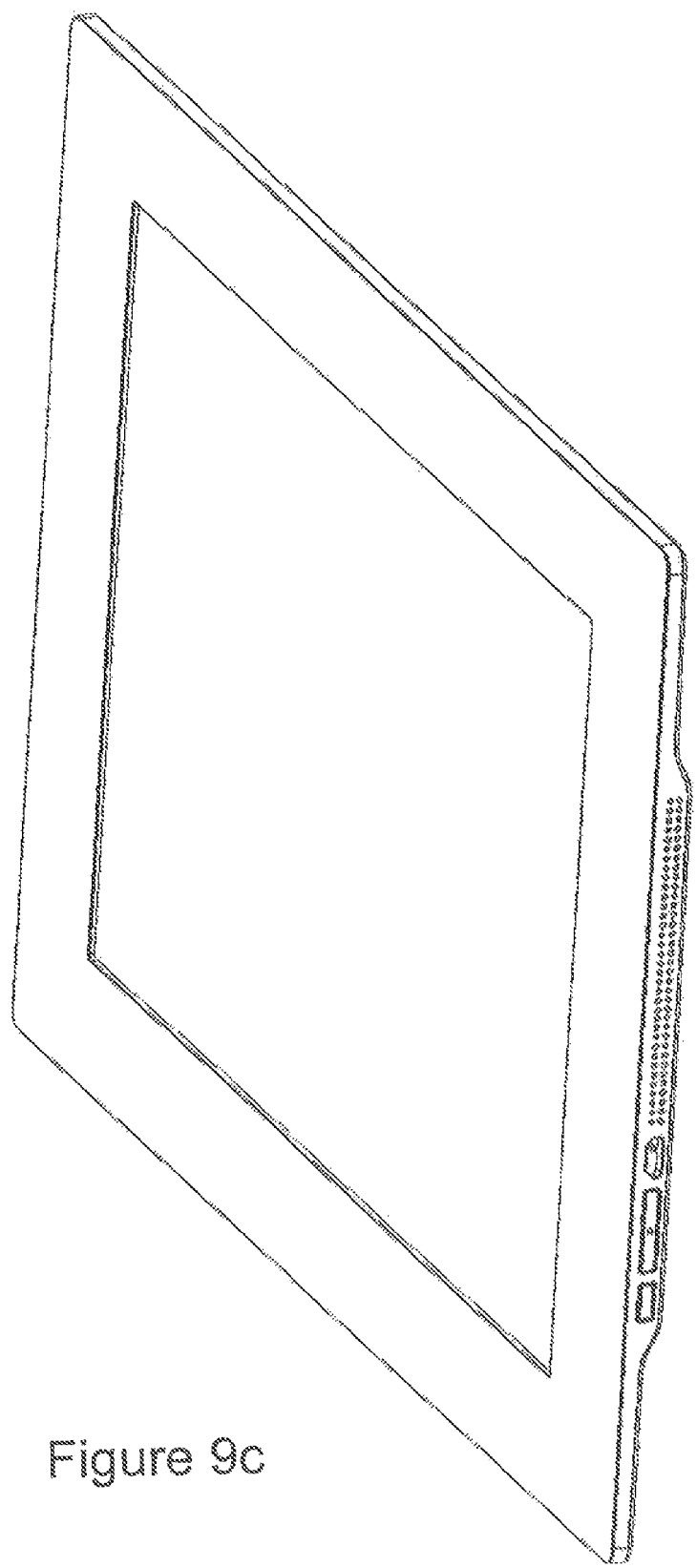

In embodiments the device is very thin, less than 5 mm thick at a perimeter of the device as illustrated in FIG. 9*a* the device has a removable rear panel, itself of order 1 mm thick, less in places (for example at the location of the battery) and since this panel should be removable, this creates difficulties with conventional screw fixings. A solution to this problem is illustrated in FIG. 9*b*, which shows a (simplified) cross-section through an edge of the device. This illustrates a side wall 1074 of the (one-piece front portion of the) transparent plastic housing, and a front face 1080 of the housing. In embodiments the front portion of the transparent plastic housing provides a frame within which is located the display structure including the electrophoretic display, touch sensing layer and the protective transparent front panel over the front of the display, as illustrated in FIG. 9*c*. The interior surface of the front portion of the housing is painted black 1082 around the border of the display (in embodiments over the whole interior surface of the product bezel or frame). The housing has an internal ledge 1084, either integrally formed with the housing or integrated into the back cover. A portion of the tapered rear panel 1086 is also illustrated.

To attach the rear panel 1086 to the remainder of the housing stretch-release adhesive tape 1088 is employed, the strength of this adhesive providing structural rigidity to the housing. A small gap or gutter is provided between the rear panel 1086 and sidewall 1074 and a pull-tab (not shown in FIG. 9*b*) is located in this gutter. To remove the rear of the housing the pull-tab is wound onto a rotating wheel (it is convenient to provide a special tool to facilitate this), the de-sticking front moving along an edge of the rear panel as the tape is wound onto the wheel. To release the rear panel the tape is removed from two edges of the rear panel, which can then be gently peeled away. In an alternative arrangement access to the or each tab of the tape may be provided via (through or underneath) a mechanical button of the device.

Referring now to FIG. 10, this shows views of the display structure and connectors of a constructed embodiment of an electronic document reading device, including features as described above, before and after connection of the connectors to a control circuit board. In FIG. 10 like elements to those previously described are indicated by like reference signs.

Figure 10A:
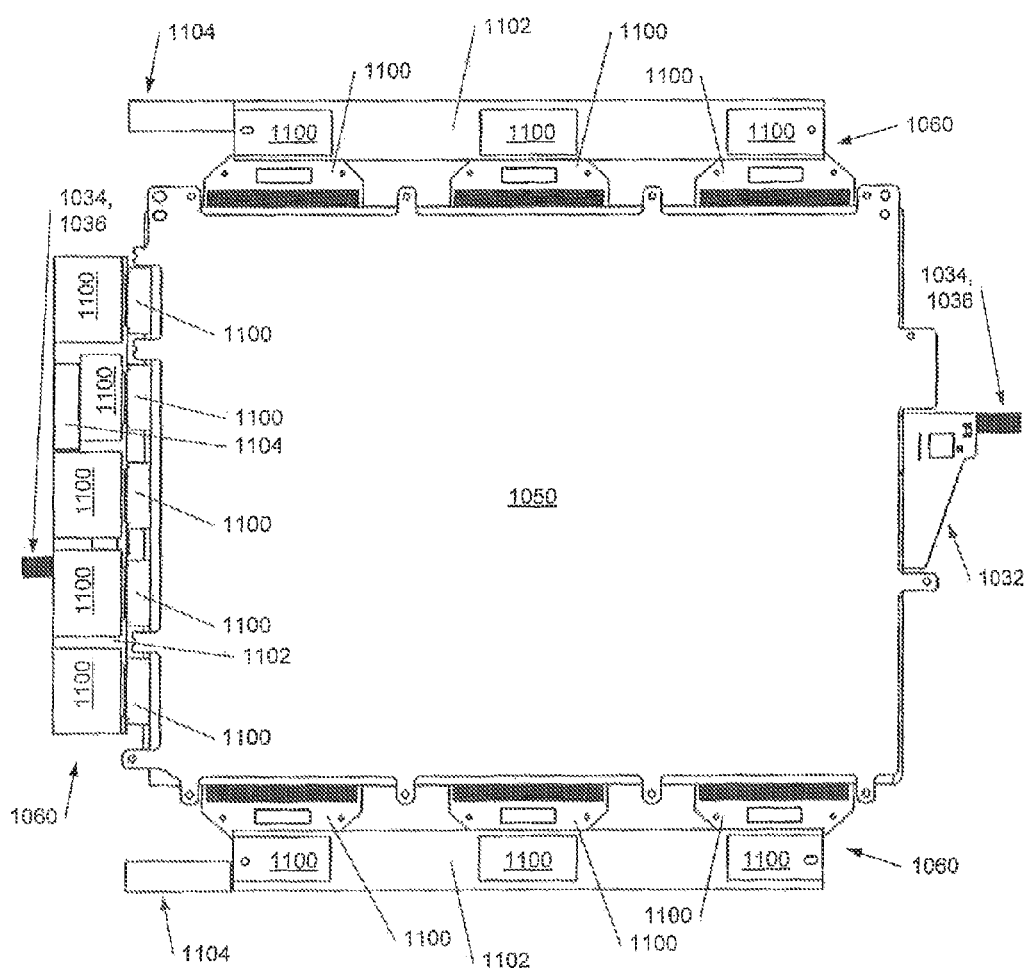
FIGS. 10a-10c show, respectively, a rear view of an internal structure of an electronic document reading device according to an embodiment of the invention prior to assembly, a front view of the arrangement of FIG. 10a, and a view after assembly illustrating bending of the connectors through 180° to make contact to a control circuit board (not shown)
Figure 10B:
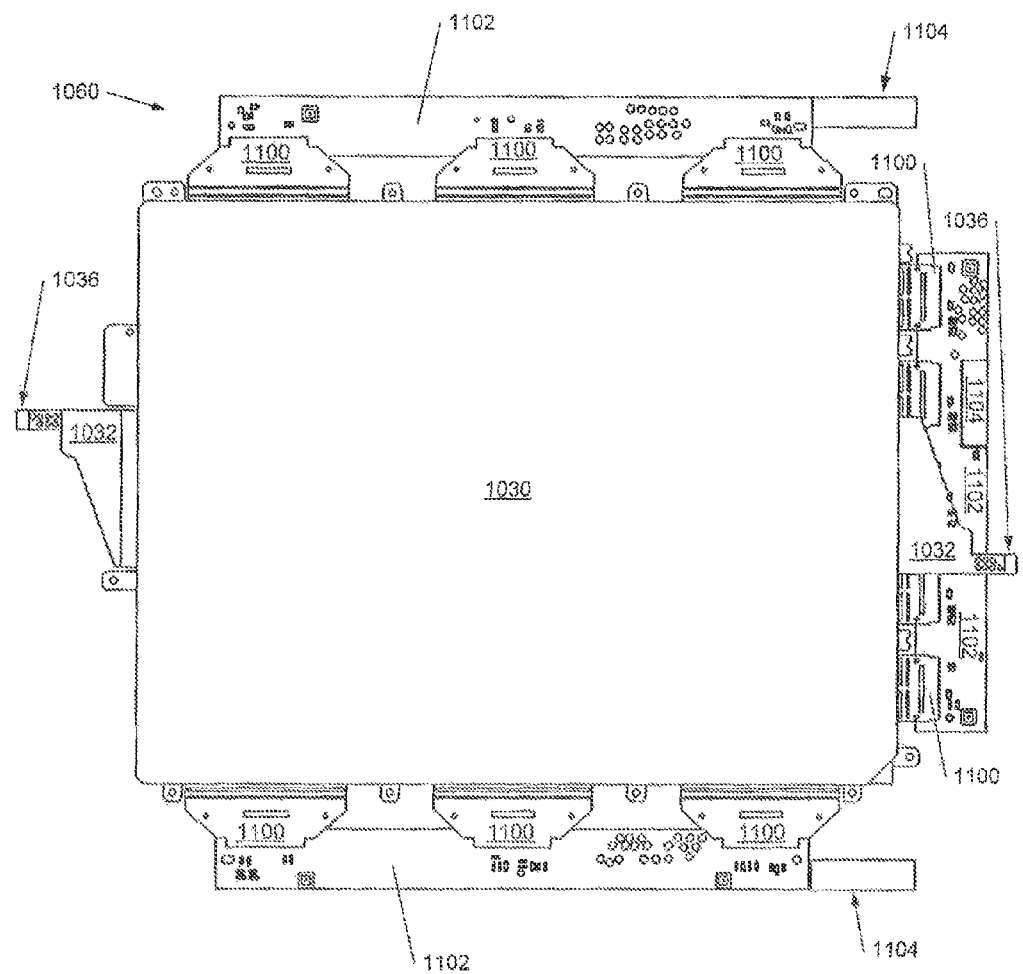
Figure 10C:
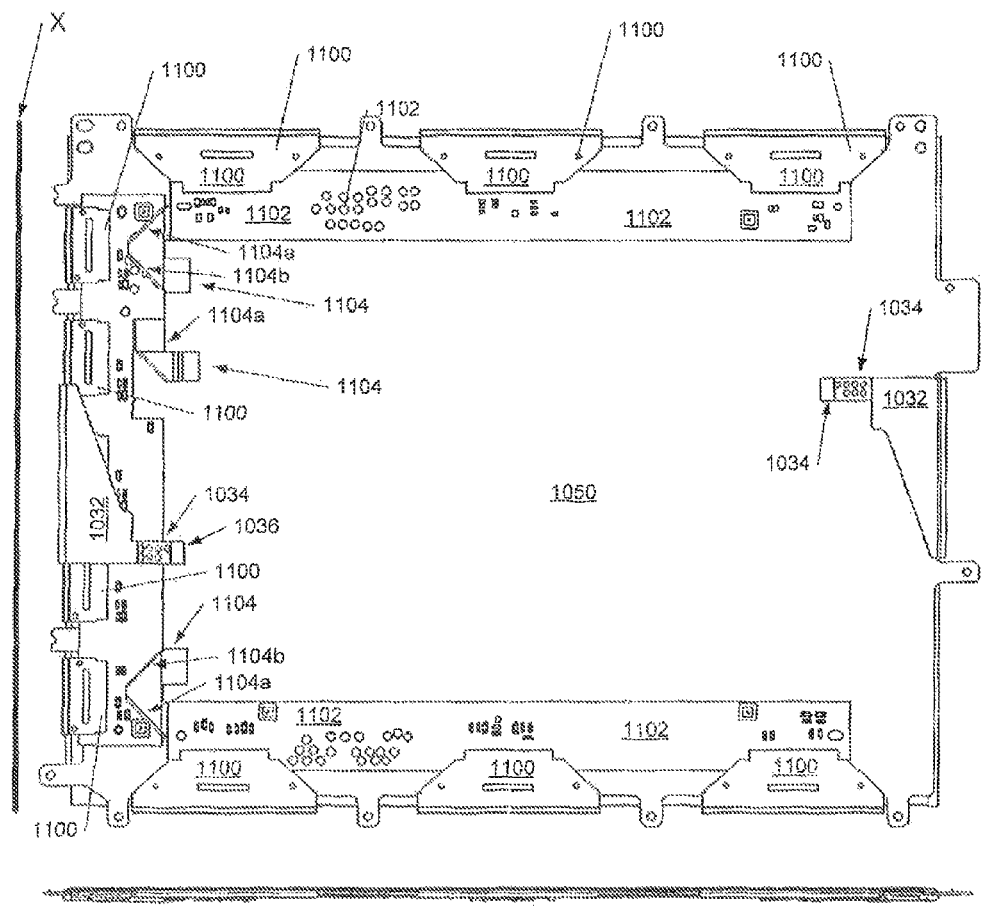

In more detail, FIG. 10*a* shows a view looking towards the rear of the device showing the mid-frame 1050 (the control circuit board 1054 is omitted for clarity), with the flexible connectors 1032, 1060 to the touch screen and display shown prior to assembly, before they are closed over the control circuit board 1054. FIG. 10*b* shows the same arrangement from the front, showing the touch sensing layer 1030 of the display connected to the flexible printed circuit boards 1032 (with connector pads in regions 1036). FIG. 10*c* illustrates the arrangement when assembled, when the connectors 1032, 1060 are rotated through 180° about their respective edges of the display after the control circuit board has been attached to the mid-frame 1050, to make connections to the control circuit board. FIG. 10*c* also illustrates views from the side of the assembly, giving an impression of the extreme thinness of the arrangement.

As illustrated, a connector 1060 to the active matrix backplane comprises a first part 1100 which connects to the backplane and which, on assembly, is turned through 180° along the edge of the active matrix backplane (the TCP, tape carrier package, achieves this with two 90 degrees turns). This is electrically connected to a second part 1102 comprising a flexible printed circuit board. The flexible circuit board 1102 of each connector has an end tab 1104 (in which the electrical connections run longitudinally) which is folded to make connections to the control circuit board. This is illustrated in more detail in FIG. 10*c*, where it is illustrated that the tabs 1104 of the connectors to two opposite edges of the active matrix backplane each have two right angle folds 1104*a, b* in their tabs whilst the active matrix backplane connector on an orthogonal edge has a single right angle fold 1104*a* in its tab. In this way at the point of connection of the tabs 1104 to the control circuit board the longitudinal directions of the tabs are substantially aligned, and also aligned with the corresponding tabs 1036 on the connectors 1032 to the touch sensing layer. This in turn enables the display structure, comprising the mid-frame 1050 mounting the active matrix backplane, electrophoritic display, and touch sensing layer, to be flexed longitudinally (for example in FIG. 10*c* lifting the left and right edges whilst depressing the middle or vice versa): The longitudinally aligned tabs allow for this flexure without over stressing the connections to the control circuit board.

Figure 11:
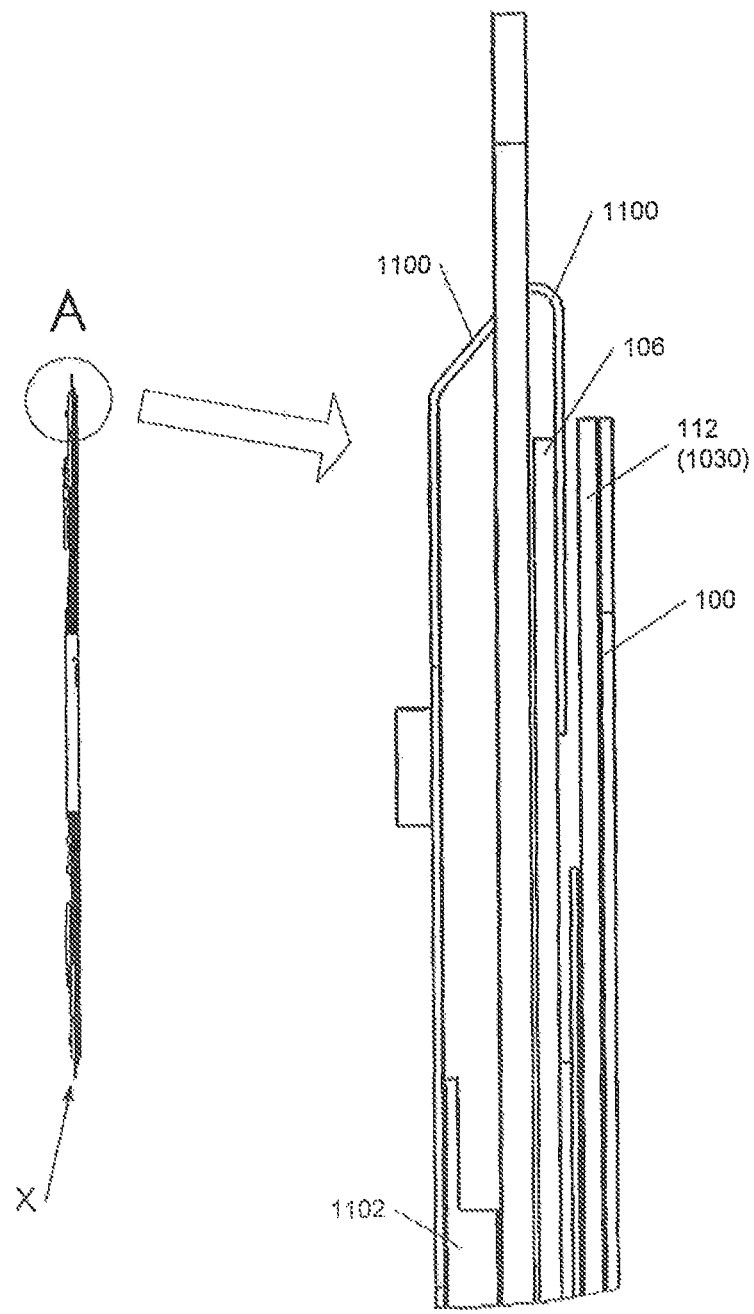
FIG. 11 shows a detailed cross-sectional view through a portion of the structure of FIG. 10.

Referring now to FIG. 11, this shows details of the cross-section X through the structure shown in FIG. 10*c* and an enlargement of the region ringed A. Again like elements to those previously described are indicated by like reference numerals. FIG. 11 illustrates the substantially 180° approximately U-shaped bend in the first connector part 1100 of flexible connector 1060.

Figure 12:
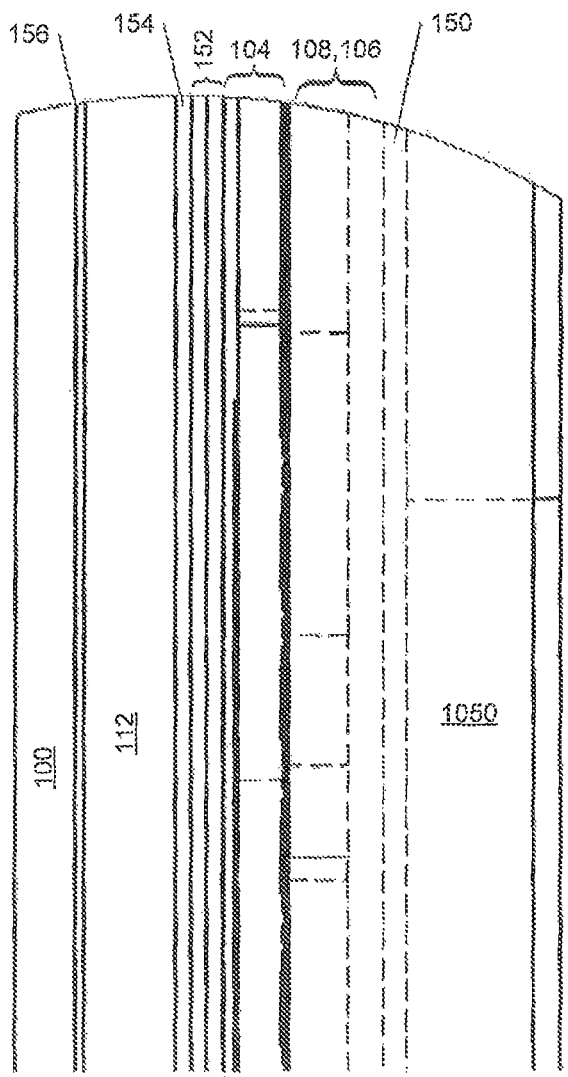
FIG. 12 shows a detailed cross-sectional view of a display structure of an electronic document reading device according to an embodiment of the invention.

FIG. 12 illustrates a detailed cross-sectional view through the display structure and control circuit board, again with like elements indicated by like reference numerals. A first adhesive layer 150 laminates the backplane and encapsulation 105,106 to the mid-frame 150. A top encapsulant film 152 is provided over the electrophoretic display 104 and a layer of optically clear adhesive 154 laminates this to the touch sensing layer 112. An upper layer of optically clear adhesive 156 laminates the display structure to the front window 100.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A flex-tolerant electronic document reading device, the device comprising:
   a pixellated flexible display screen;
   a flexible active matrix backplane laminated onto said display screen and configured to drive pixels of said display screen, said active matrix backplane having a plastic substrate;
   a control circuit board mounting control electronics for said electronic document reading device;
   a flex-tolerant housing for said display screen, active matrix backplane and control circuit board; and
   further comprising a frame plate located between said active matrix backplane and said circuit board, said frame plate extending over and beyond an active area of said display screen;
   wherein said combination of said flexible active matrix backplane and said display screen is laminated onto said frame plate, wherein said frame plate has at least one frame plate datum point, and wherein said frame plate is attached to said housing at said at least one frame plate datum point to hold said frame plate in fixed alignment with said housing and to stiffen said combination of said flex-tolerant housing and said flexible active matrix backplane and display screen.

2. The flex-tolerant electronic document reading device as claimed in claim 1 wherein said display screen is an electrophoretic display screen and wherein said frame plate is a metal frame plate.

3. The flex-tolerant electronic document reading device as claimed in claim 1 wherein said control circuit board is mounted on an opposite surface of said frame plate to said active matrix backplane by a plurality of flexible mounts to enable said control circuit board to move laterally with respect to said frame plate.

4. The flex-tolerant electronic document reading device as claimed in claim 1 wherein said frame plate is attached at said at least one said frame plate datum point to a datum point on said control circuit board.

5. The flex-tolerant electronic document reading device as claimed in claim 1 wherein said active area of said display screen has a diagonal dimension of at least 20 cm, wherein said electronic document reading device has a thickness of no greater than 9 mm, and wherein said frame plate is attached to said housing at a plurality of positions around the perimeter of said frameplate outside said active area of said display screen.

6. The flex-tolerant electronic document reading device as claimed in claim 5 wherein said device has a thickness of no greater than 6 mm at a perimeter of said device, wherein said housing has a removable rear panel extending over substantially a complete rear face of said housing, and wherein said removable rear panel is attached to said housing at edges of said rear panel adjacent said perimeter of said device by stretch release adhesive tape between an interior surface of said rear panel and an interior ledge of said housing.

\* \* \* \* \*